US012734496B2

(12) United States Patent
Thies et al.

(10) Patent No.: US 12,734,496 B2
(45) Date of Patent: Sep. 15, 2026

(54) FLUIDIZING APPARATUS FOR THE TREATMENT OF PARTICULATE MATERIAL

(71) Applicant: Glatt Gesellschaft mit beschränkter Haftung, Binzen (DE)

(72) Inventors: Jochen Thies, Lörrach (DE); Dirk Zimmermann, Wehr (DE); Heinz Gottschling, Weil am Rhein (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 605 days.

(21) Appl. No.: 18/260,915

(22) PCT Filed: Dec. 16, 2021

(86) PCT No.: PCT/EP2021/086087

§ 371 (c)(1),
(2) Date: Jul. 10, 2023

(87) PCT Pub. No.: WO2022/148626

PCT Pub. Date: Jul. 14, 2022

(65) Prior Publication Data

US 2024/0307840 A1 Sep. 19, 2024

(30) Foreign Application Priority Data

Jan. 11, 2021 (DE) ..................... 10 2021 200 162.9

(51) Int. Cl.
*B01J 2/16* (2006.01)
*B01J 8/00* (2006.01)
(Continued)

(52) U.S. Cl.
CPC .................. *B01J 8/22* (2013.01); *B01J 2/16* (2013.01); *B01J 8/002* (2013.01); *B01J 8/44* (2013.01);
(Continued)

(58) Field of Classification Search
CPC ....... B01J 2/16; B01J 8/002; B01J 8/44; B01J 2208/00761; B01J 2208/0092; B01J 2208/00938
See application file for complete search history.

(56) References Cited

U.S. PATENT DOCUMENTS 4,970,804 A 11/1990 Huttlin
5,115,578 A 5/1992 Basten
(Continued)

FOREIGN PATENT DOCUMENTS

CN 1291119 A 4/2001
CN 102099649 A 6/2011
(Continued)

*Primary Examiner* — Randy Boyer
(74) *Attorney, Agent, or Firm* — The Webb Law Firm

(57) ABSTRACT

A fluidizing apparatus for the treatment of particulate material. The fluidizing apparatus includes a fluidization unit which has a longitudinal axis and a perforated distributor plate which divides the fluidization unit into a distributor chamber and a fluidization chamber arranged above the distributor chamber. The distributor chamber includes a web arranged in the region of a material outlet surface and extending at least partially in the circumferential direction. The distributor plate is arranged movably relative to the fluidization unit.

16 Claims, 9 Drawing Sheets

(51) Int. Cl.
*B01J 8/22* (2006.01)
*B01J 8/44* (2006.01)

(52) U.S. Cl.
CPC ................. *B01J 2208/00761* (2013.01); *B01J 2208/0092* (2013.01); *B01J 2208/00938* (2013.01)

(56) References Cited

U.S. PATENT DOCUMENTS

| | | | |
|---|---|---|---|
| 6,253,465 | B1 | 7/2001 | Ichitani et al. |
| 8,844,162 | B2 | 9/2014 | Krell et al. |
| 2003/0190417 | A1 | 10/2003 | Takei et al. |
| 2013/0195562 | A1 | 8/2013 | Viarouge et al. |
| 2021/0220786 | A1 | 7/2021 | Thies et al. |

FOREIGN PATENT DOCUMENTS

| | | | | | |
|---|---|---|---|---|---|
| DE | 1150320 | | | 6/1963 | |
| DE | 236006 | A1 | | 5/1986 | |
| DE | 19528577 | A1 | | 2/1997 | |
| DE | 19528584 | A1 | * | 2/1997 | ................ B01J 2/16 |
| DE | 102018103801 | A1 | | 2/2019 | |
| EP | 0370167 | B1 | | 10/1991 | |
| EP | 1878489 | A2 | | 7/2007 | |
| EP | 2611531 | | | 7/2013 | |
| JP | S461572 | B | | 1/1971 | |
| JP | S4740054 | Y1 | | 12/1972 | |
| JP | S4823181 | A | | 3/1973 | |
| JP | S5387976 | A | | 8/1978 | |
| JP | H7265683 | A | | 10/1995 | |
| WO | 2012028894 | A1 | | 3/2012 | |
| WO | 2019233746 | A1 | | 12/2019 | |

* cited by examiner

PG
18
28
1
X
16
17
15
6
2
13
14
3
35
7
34
23b
21
19
20
25
Z
Z
M
8
Y
Y
9
24
26
4
22
31
30
23a
5
12
11
29
38
X
27
10
PG

FLUIDIZING APPARATUS FOR THE TREATMENT OF PARTICULATE MATERIAL

CROSS-REFERENCE TO RELATED APPLICATIONS

This application is the United States national phase of International Application No. PCT/EP2021/086087 filed Dec. 16, 2021, and claims priority to German Patent Application No. 10 2021 200 162.9 filed Jan. 11, 2021, the disclosures of which are hereby incorporated by reference in their entireties.

BACKGROUND

Field

The invention relates to fluidizing apparatus for the treatment of particulate material, having a fluidization unit which has a longitudinal axis and which has a perforated distributor plate which divides the fluidization unit into a distributor chamber and a fluidization chamber arranged above said distributor chamber, wherein the fluidization chamber comprises a material inlet for the material to be treated and the distributor chamber comprises a material discharge which has a material outlet for the treated material with a material outlet surface, a lower and an upper edge, and a shut-off device closes the material discharge, and wherein the distributor chamber comprises a fluid inlet and the fluidization chamber comprises a fluid outlet for a process gas flowing from the fluid inlet through the perforated distributor plate to the fluid outlet and fluidizing the material in the fluidization chamber.

DESCRIPTION OF RELATED ART

Fluidizing apparatus for the treatment of particulate material and, in particular, fluidized bed equipment has been known in the art for some time.

EP 2 611 531 A1 discloses fluidized bed equipment for the processing of particulate material which comprises a chamber enclosing a distributor chamber, a perforated distributor plate arranged above the distributor chamber, an inlet and an outlet for the process gas and a discharge opening having a lower and an upper edge, defining a height and an opening surface, wherein the distributor plate is positioned above the lower edge of the discharge opening in such a manner that the opening surface of the discharge opening is divided into an opening surface below the distributor plate and an opening surface above the distributor plate.

The disadvantage of this is that when the particulate material is discharged, the process gas forms a kind of curtain at the discharge opening, when it flows from the distributor chamber about the distributor plate into the fluidization chamber. This curtain limits the discharge of the particulate material at least partially and at the same time reduces the emptying speed of the particulate material from the fluidizing apparatus.

SUMMARY

The problem addressed by the invention is therefore, firstly, that of further improving the emptying of fluidizing apparatus in terms of the emptying speed and, secondly, at the same time overcoming the disadvantages of the prior art.

The problem is solved in the case of fluidizing apparatus of the kind referred to above, in that the distributor chamber comprises a web arranged in the region of the material outlet surface and extending at least partially in the circumferential direction, and the distributor plate is arranged so as to be movable relative to the fluidization unit, wherein the distributor plate can be moved into an emptying position through a movement of the distributor plate relative to the fluidization unit, wherein the distributor plate is arranged on the web in the emptying state, in such a manner that a fluid connection is created between the material outlet arranged in the distributor chamber and past the fluidization chamber on the distributor plate, in order to discharge treated material from the fluidization unit, and wherein in the emptying state the shut-off device opens up the material discharge in the emptying position of the distributor plate.

The advantage of this embodiment is that the web on which the distributor plate is arranged prevents the process gas flow from flowing around said distributor plate in the region of the material outlet surface and thereby forming a kind of "process gas curtain" which restricts, or completely prevents, the discharge of the treated material. In addition, the web prevents the material treated in the fluidization chamber from falling into the distributor chamber during discharge through the resulting gap between the distributor plate and the distributor chamber inner wall.

Advantageously, the relative movement between the distributor plate and the fluidization unit means that the particulate material can be emptied following treatment via the material discharge. The relative movement can be carried out in such a manner that the process gas supports the emptying of the treated material via the material discharge.

According to an advantageous embodiment of the fluidizing apparatus in this respect, the distributor plate is preferably arranged above the upper edge of the material outlet in an operating position. If the distributor plate is in the operating position, the fluidizing apparatus is in the operating state. Consequently, in the operating position the material can be treated without a material discharge via the material outlet in the fluidization chamber.

In the emptying position, the distributor plate is positioned by a movement of the distributor plate relative to the fluidization unit preferably at least partially below the upper edge of the material outlet. In the emptying position, the fluidizing apparatus is in the emptying state.

According to a particularly advantageous development of the fluidizing apparatus, an upper side of the web is arranged tangentially to the material outlet surface of the material outlet or against the flow direction of the process gas beneath the material outlet. This kind of arrangement of the web in the distributor chamber means that the discharge of treated material from the fluidization unit, in particular from the fluidization chamber, is substantially improved. In this respect, the upper side of the web is advantageously arranged tangentially to the lower edge of the material outlet surface of the material outlet. This embodiment is particularly advantageous, since the treated material can thereby be discharged from the fluidization unit in an unobstructed manner.

Moreover, the web is preferably sickle-shaped, in particular crescent-shaped, or ring-shaped in design. In this way, the process gas flow is least severely affected, so that the fluidization of the material being treated in the fluidization chamber continues to work very effectively in the operating position.

According to an advantageous embodiment of the fluidizing apparatus in this respect, the fluidization unit has a swivel axis running transversely to the longitudinal axis of the fluidization unit, on which swivel axis the distributor plate is arranged in a swivelling manner. The swivel axis advantageously runs perpendicularly to the central longitudinal axis of the fluidization unit. This embodiment facilitates a simple relative movement in the form of a swivel movement about the swivel axis.

In this way, on the one hand the material outlet of the material discharge arranged in the distributor chamber for the emptying of the material treated in the fluidization chamber is opened, and on the other hand emptying is promoted by the oblique position of the distributor plate—as is also the case with liquids. Moreover, the distributor plate is preferably swivelled about the swivel axis by an angle of between 0° and 60°, advantageously by an angle from 5° to 10°. The swivel movement causes a substantially ring-shaped or sickle-shaped gap to form between the distributor plate and the distributor chamber and/or the fluidization chamber, which gap should not be too large, since otherwise there is a risk in this case of treated material being able to get into the distributor chamber in the emptying state, despite process gas flowing through the gap. The gap is sealed in principle by the process gas. In the region of the material outlet, the fluidization unit, in particular the distributor chamber, exhibits no gap through the web extending at least partially in the circumferential direction. The distributor plate is swivelled about the swivel axis and arranged on the web.

In an alternative embodiment of the fluidizing apparatus which is further advantageous in this respect, the distributor plate is arranged so as to be displaceable in the axial direction of the longitudinal axis. The distributor plate is displaced in the axial direction of the longitudinal axis in the manner of a linear movement. Advantageously, the distributor plate is displaced until its upper side is positioned flush with the lower edge or below said lower edge. The distributor plate is preferably arranged so as to be displaceable in the axial direction of the longitudinal axis. The material outlet for improved emptying following the treatment of the particulate material is also opened by the alternative design.

Further advantageously, the fluidization unit has a swivel axis which runs transversely to the longitudinal axis of the fluidization unit and is arranged so as to be displaceable in the axial direction of the longitudinal axis, on which swivel axis the distributor plate is arranged such that it can swivel. As a result of this embodiment of the fluidizing apparatus, the advantages of the two alternative embodiments of the preferred fluidizing apparatus, namely the swivel and the linear movement, are combined. In addition, at the point where the web is not arranged, the gap which forms between the fluidization unit and the distributor plate is smaller.

According to an additional advantageous design of the fluidizing apparatus, the distributor plate, in particular the upper side of the distributor plate, is positioned at least partially below the lower edge of the material outlet in the emptying position due to the movement of the distributor plate relative to the fluidization unit. Particularly preferably, the distributor plate, in particular the upper side of the distributor plate, is positioned below the lower edge of the material outlet in the emptying position due to the movement of the distributor plate relative to the fluidization unit. As a result of this, the material outlet surface is opened to the maximum, so that emptying of the treated material can take place efficiently and quickly.

Advantageously, the material discharge designed in particular as an emptying pipe is assigned a fluid connection comprising a fluid connection outlet for providing an auxiliary gas. It is possible to supply a fluid, advantageously an auxiliary or backup gas, to the material discharge via the fluid connection, in order to promote and improve the discharge of treated material. The auxiliary gas preferably corresponds to the process gas. More preferably, the auxiliary gas is diverted from the process gas and fed back to said process gas following the material discharge in a circulating operation.

In this regard, according to a development of the fluidizing apparatus, the material discharge has a bottom insert which divides the material discharge into a material channel transporting the treated material from the fluidization unit and a fluid channel carrying the auxiliary gas, wherein the fluid connection outlet is arranged in the bottom insert, so that the auxiliary gas can overflow from the fluid channel into the material channel. This provides a very simple and space-saving design for the introduction of the auxiliary gas, in particular auxiliary air.

The fluid connection outlet preferably has a perforated cover or is formed by bores in the bottom insert. The perforated cover or the correspondingly designed bores prevent the treated material to be discharged from the fluidization unit from falling into the fluid connection and clogging said connection. Particularly preferably, the fluid connection outlet, in particular a part of the perforated cover or the bores, is designed in such a manner that the auxiliary gas has an outflow direction towards the discharge of the treated material. This highly preferable development further promotes the discharge of the treated material.

The fluid connection outlet is advantageously arranged in the region of the material outlet surface. It is thereby ensured that the auxiliary gas conveys and/or supports the treated material to be discharged directly after the material outlet.

A method for the treatment of particulate material in preferred fluidizing apparatus is described below. The method for the treatment of particulate material in fluidizing apparatus, having a fluidization unit which has a longitudinal axis and which has a perforated distributor plate which divides the fluidization unit into a distributor chamber and a fluidization chamber arranged above said distributor chamber, wherein the fluidization chamber comprises a material inlet for the material to be treated and the distributor chamber comprises a material discharge which has a material outlet for the treated material with a material outlet surface, a lower and an upper edge, and a shut-off device closes the material discharge, and wherein the distributor chamber comprises a fluid inlet and the fluidization chamber comprises a fluid outlet for a process gas flowing from the fluid inlet through the perforated distributor plate to the fluid outlet and fluidizing the material in the fluidization chamber, wherein in an operating state, the fluidization chamber is first filled with material to be treated via the material inlet and then the material is treated by the process gas flowing through the fluidization chamber, wherein the distributor chamber comprises a web arranged in the region of the material outlet surface and extending at least partially in the circumferential direction and, according to the operating state of the distributor plate arranged movably relative to the fluidization unit, is moved into an emptying position in such a manner that the distributor plate is arranged on the web in the emptying state, such that a fluid connection forms between the material outlet arranged in the distributor chamber and the fluidization chamber past the distributor plate and the treated material is discharged from the fluidization unit via the material outlet, wherein in the emptying state when the distributor plate is in the emptying position, the shut-off device opens up the material discharge.

The advantage of this embodiment is that the web on which the distributor plate is arranged prevents the process gas flow from flowing around the distributor plate in the region of the material outlet surface and thereby forming a kind of "process gas curtain" which restricts, or completely prevents, the discharge of the treated material. In addition, the web prevents the material treated in the fluidization chamber from falling into the distributor chamber during discharge through the resulting gap between the distributor plate and the distributor chamber inner wall.

Further advantageously, the particulate material can be emptied via the material discharge following treatment, due to the relative movement between the distributor plate and the fluidization unit. The relative movement can be performed in a manner such that the process gas assists with the emptying of the treated material via the material discharge.

According to an advantageous embodiment of the method in this respect, the fluidization unit has a swivel axis which runs transversely to the longitudinal axis of the fluidization unit, on which swivel axis the distributor plate is arranged in a swivelling manner and about which the distributor plate is swivelled after the particulate material has been treated, advantageously by 5° to 10°. As a result of this embodiment, a simple relative movement in the form of a swivel movement about the swivel axis is possible. In this way, on the one hand the material outlet of the material discharge arranged in the distributor chamber for the emptying of the material treated in the fluidization chamber is preferably opened, and on the other hand emptying is promoted by the oblique position of the distributor plate. Moreover, the distributor plate is preferably swivelled about the swivel axis by an angle of between 0° and 60°, advantageously by an angle of 5° to 10°. The swivel movement causes a substantially sickle-shaped or ring-shaped gap to form between the distributor plate and the distributor chamber and/or the fluidization chamber, which gap should not be too large, since otherwise there is a risk in this case of treated material being able to get into the distributor chamber in the emptying state, despite process gas flowing through the gap. The process gas advantageously seals the gap in the emptying state—at the point where the web is not arranged.

According to a likewise advantageous embodiment of the method in this regard, the distributor plate is arranged so as to be displaceable in the axial direction of the longitudinal axis and is displaced in the axial direction of the longitudinal axis in the manner of a linear movement, advantageously until the distributor plate is positioned below the lower edge of the material outlet. The distributor plate is preferably displaced in the axial direction of the longitudinal axis. The alternative embodiment also means that the material outlet is opened for improved emptying following treatment of the particulate material.

Particularly preferably, when it is moved into the emptying position, the distributor plate performs a swivel movement and a linear movement. In this case, on the one hand the distributor plate is swivelled about the swivel axis by means of a swivel movement and, on the other hand is displaced in the axial direction of the longitudinal axis in the manner of a linear movement. The swivel and linear movements can be carried out consecutively or simultaneously with respect to one another in any sequence. As a result, the advantages of both the swivel movement and the linear movement are brought to bear.

According to an additional advantageous embodiment of the method, the distributor plate is moved into the emptying position relative to the fluidization unit in such a manner that at least a part of the distributor plate is positioned below the lower edge of the material outlet. With reference to this, the distributor plate is moved into the emptying position relative to the fluidization unit in such a manner that the distributor plate is positioned below the lower edge of the material outlet. Alternatively, the upper edge or the upper side of the distributor plate is arranged flush with the lower edge of the material outlet. In both cases, the material outlet surface is opened to the maximum, so that the treated material can be emptied efficiently and quickly.

According to an additional advantageous development of the method, the material discharge has a shut-off device which opens up the material discharge as soon as the distributor plate is in the emptying position. The shut-off device preferably opens up the material discharge as soon as at least part of the distributor plate is positioned below the lower edge of the material outlet. As a result of this, the material outlet surface is opened to the maximum and the material treated in the fluidization chamber of the fluidization unit can be discharged from the fluidization unit of the fluidizing apparatus effectively and in a time-saving manner.

According to a further advantageous development of the method, the material discharge, which is particularly designed as an emptying pipe, is assigned a fluid connection comprising a fluid connection outlet, for supplying an auxiliary gas, wherein the auxiliary gas flows via the fluid connection outlet into the material discharge, at least when the shut-off device opens up the material discharge, in order to promote the discharge of the treated material. By means of the fluid connection, it is possible to supply a fluid, advantageously an auxiliary or back-up gas, to the material discharge, in order to promote and improve the discharge of treated materials. The auxiliary gas preferably corresponds to the process gas. More preferably, the auxiliary gas is diverted from the process gas and fed back to said process gas following the material discharge in a circulating operation.

Particularly preferably, the fluid connection outlet, in particular a part of the perforated cover or of the bores, is designed in such a way that the auxiliary gas has an outflow direction towards the discharge of the treated material. This very preferable development further promotes the discharge of the treated material.

Advantageously, the previously described method is carried out on the fluidizing apparatus.

BRIEF DESCRIPTION OF THE DRAWINGS

The invention is explained in greater detail below with reference to the accompanying drawing in which.

DETAILED DESCRIPTION

Figure 1:
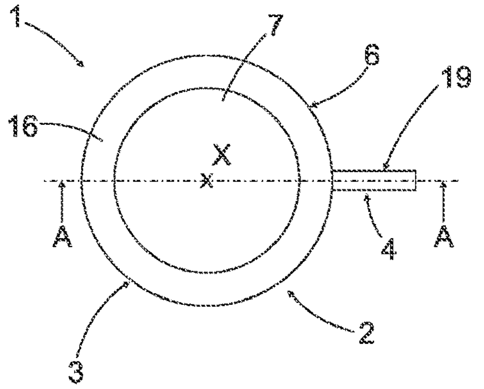
FIG. 1 shows a plan view of a schematic representation of a first embodiment of fluidizing apparatus in the operating position with a sectional plane A-A.

Unless otherwise indicated, the following description refers to all embodiments of fluidizing apparatus 1 illustrated in the drawing for the treatment of particulate material M.

FIG. 1 shows a plan view of a schematic representation of a first embodiment of the fluidizing apparatus 1 with a sectional plane A-A designed as fluidized bed equipment 2. The fluidizing apparatus 1 comprises a fluidization unit 3 having a central longitudinal axis X-X on which an emptying pipe 4 comprising a central axis Y-Y running perpendicular to the longitudinal axis X-X is arranged. The central axis Y-Y and the longitudinal axis X-X span the sectional plane A-A. The fluidizing apparatus 1 is in the operating state.

Figure 2:
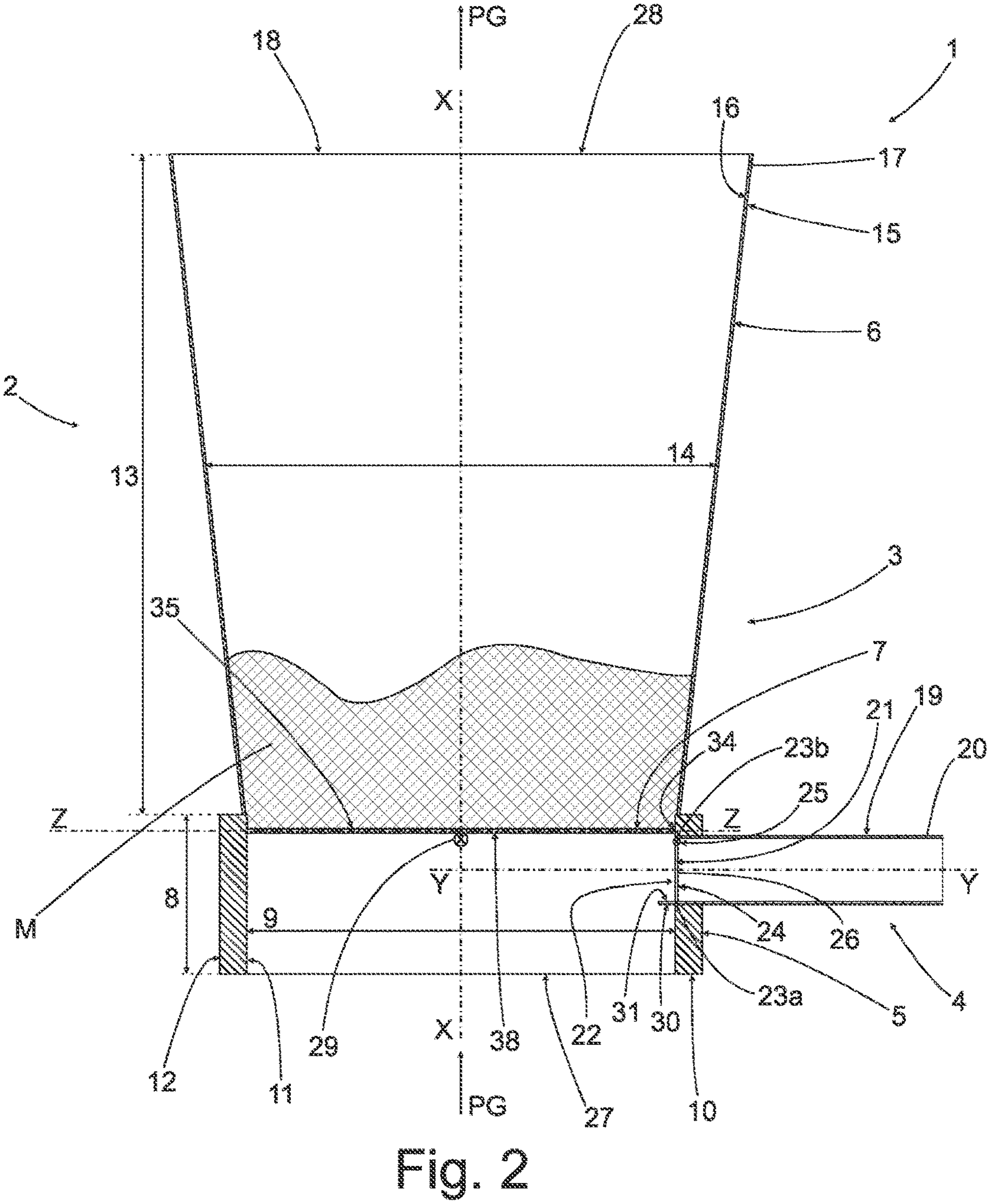
FIG. 2 shows a section along the sectional plane A-A shown in FIG. 1 through the schematic representation of the first embodiment of the fluidization equipment in the operating position with a distributor plate arranged on a swivel axis in the horizontal position.

FIG. 2 shows a section along the sectional plane A-A shown in FIG. 1 through the schematic representation of the first embodiment of the fluidizing apparatus 1 designed as fluidized bed equipment 2 in the operating position.

The fluidization unit 3 comprises a perforated distributor plate 7 which divides the fluidization unit 3 into a distributor chamber 5 and a fluidization chamber 6 arranged above the distributor chamber 5. In the operating position, the distributor plate 7 is in a plane Z-Z formed at right angles to the sectional plane A-A, so that in the operating position material M to be treated is arranged above the distributor plate 7 in the fluidization chamber 6. If the distributor plate 7 is in the operating position, the fluidizing apparatus 1 is in the operating state.

The fluidization unit 3 of the fluidizing apparatus 1 designed as fluidized bed equipment 2 is designed so as to be rotationally symmetrical about the central longitudinal axis X-X. Other geometric shapes, such as rectangular, in particular square, are realized in other embodiments which are not shown.

In the embodiment shown in FIG. 2, the distributor chamber 5 has a circular cylindrical shape with a distributor chamber inner diameter 9 which is constant over a distributor chamber height 8. The distributor chamber 5 has a distributor chamber wall 10 spaced radially to the longitudinal axis X-X. The distributor chamber wall 10 has an inner surface of the distributor chamber wall 10, referred to as the distributor chamber inner wall 11, and an outer surface of the distributor chamber wall 10, referred to as the distributor chamber outer wall 12.

In the embodiment shown, the fluidization chamber 6 is also of circular cylindrical design, wherein, in contrast to the distributor chamber 5, the fluidization chamber 6 has a conical shape with a fluidization chamber inside diameter 14 which increases from bottom to top over a fluidization chamber height 13. The fluidization chamber 6 has a fluidization chamber wall 15 which is spaced apart radially with respect to the longitudinal axis X-X. The fluidization chamber wall 15 has an inner surface of the fluidization chamber wall 15, referred to as the fluidization chamber inner wall 16, and an outer surface of the fluidization chamber wall 15, referred to as the fluidization chamber outer wall 17.

The fluidization chamber 6 also comprises a material inlet 18 for the material M to be treated and the distributor chamber 5 comprises a material discharge 19 for the treated material M'. The material discharge 19 is designed, in particular, as the emptying pipe 4 having an emptying pipe wall 20, which emptying pipe, in the embodiment shown in FIG. 2, is arranged at right angles to the longitudinal axis X-X of the fluidization unit 3 in a rotationally symmetrical manner about the central axis Y-Y in the distributor chamber wall 10. In this case, a material outlet 21 of the material discharge 19 is arranged in such a manner that the material outlet 21 is formed flush with the distributor chamber inner wall 11. The material outlet 21 exhibits a material outlet surface 22 and has a lower and an upper edge 23*a*, 23*b* for discharging the material M' treated in the fluidization chamber 6.

The material outlet 21 of the material discharge 19 has a shutoff device 24. The shut-off device 24 is closed in the operating position of the distributor plate 7. The shut-off device 24 is advantageously designed as a flap 26 which can be swivelled about a swivel axis 25. In the operating state, the material discharge 19 of the fluidization unit 3 of the fluidizing apparatus 1 is therefore closed. The shut-off device 24 can furthermore be arranged at another position in the material discharge 19 formed as an emptying pipe 4 in the direction of the central axis Y-Y.

Furthermore, the distributor chamber 5 has a fluid inlet 27 and the fluidization chamber 6 has a fluid outlet 28. In the operating position shown in FIG. 2, the perforated distributor plate 7 is arranged in a horizontal position in the plane Z-Z, wherein a process gas PG enters the fluidization unit 3 at the fluid inlet 27 and flows from the fluid inlet 27 through the perforated distributor plate 7 to the fluid outlet 28, where it emerges from the fluidization unit 3. The perforated distributor plate 7 advantageously has through-openings for the process gas PG which are not shown and which produce a pressure loss during the through-flow. In the operating state, that is to say in the operating position of the distributor plate 7, the process gas PG fluidizes the material M to be treated in the fluidization chamber 6.

The distributor plate 7 is arranged in the fluidization unit 3 so as to be movable relative to said fluidization unit 3. In the embodiment of the fluidizing apparatus 1 shown in FIG. 2, the fluidization unit 3 has a swivel axis 29 running transversely to the longitudinal axis X-X of the fluidization unit 3, on which swivel axis the distributor plate 7 is arranged such that it can swivel. In the first embodiment of the fluidizing apparatus 1 which is depicted, the swivel axis 29 advantageously runs at right angles to the longitudinal axis X-X of the fluidization unit 3 and at right angles to the central axis Y-Y of the emptying pipe 4. In the operating state of the fluidizing apparatus 1 depicted in FIG. 2, the distributor plate 7 is arranged above the upper edge 23*b*. It is thereby ensured that no material M is discharged from the fluidization unit 3 of the fluidizing apparatus 1 during treatment of the particulate material M by the process gas PG in the fluidization chamber 6.

Moreover, the distributor chamber 5 has a web 30 which is arranged in the region of the material outlet surface 22 and extends at least partially in the circumferential direction. An upper side 31 of the web 30 is arranged tangentially to the material outlet surface 22 of the material outlet 21. Advantageously, the upper side 31 of the web 30 is arranged tangentially to the lower edge 23*a* of the material outlet surface 22 of the material outlet 21. The web 30 in this case has a sickle-shaped, in particular a crescent-shaped, design.

Figure 3:
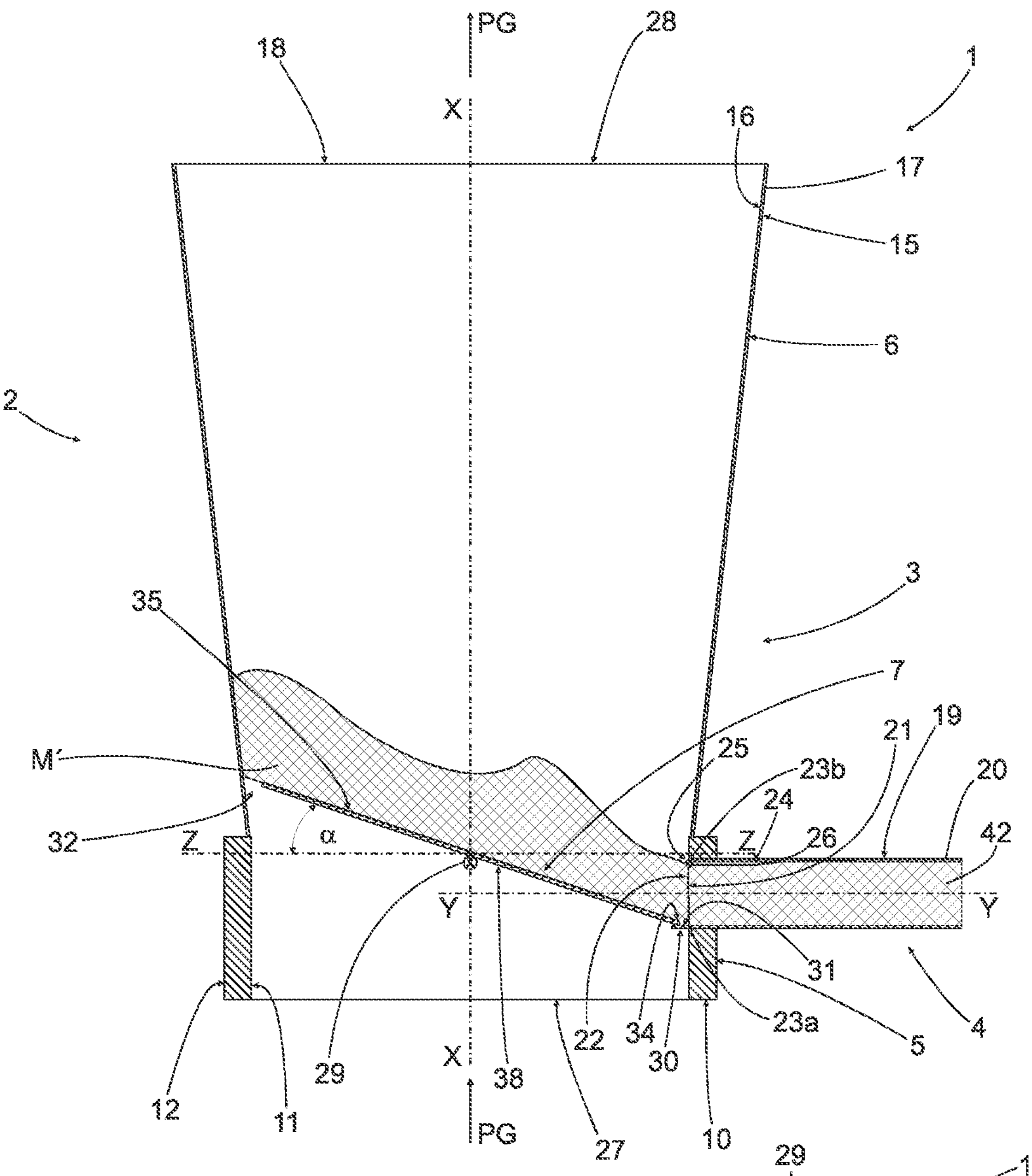
FIG. 3 shows a section along the sectional plane A-A shown in FIG. 1 through the schematic representation of the first embodiment of the fluidizing apparatus in the emptying position with the distributor plate arranged on the swivel axis in a position swivelled by an angle α about the swivel axis.

FIG. 3 shows the fluidizing apparatus 1 designed as fluidized bed equipment 2 in the emptying state. Once the particulate material M has been treated in the fluidized bed equipment 2, the treated material M' is discharged from the fluidizing apparatus 1 through the material channel 42 in the emptying state. For this purpose, the distributor plate 7, which can be introduced into an emptying position, is moved relatively in respect of the fluidization unit 3 in the form of a swivel movement, so that said distributor plate is positioned in the emptying position swivelled about a swivel axis 29 in the fluidization unit 3. If the distributor plate 7 is in the emptying position, the fluidizing apparatus 1 is in the emptying state.

In the emptying position, the distributor plate 7 is swivelled about the swivel axis 29 by an angle α, in such a manner that the distributor plate 7 is arranged on the web 30. As a result of this, a fluid connection is formed between the material outlet 21 arranged in the distributor chamber 5 and the fluidization chamber 6 past the distributor plate 7, in order to discharge treated material from the fluidization unit 3. Advantageously, the distributor plate 7 is swivelled by an angle of 5° to 10°. The treated material M' flows through this in the direction of the material outlet 21. The discharge of the treated material M' is supported by the process gas PG, which flows from the fluid inlet 27 to the fluid outlet 28 through the fluidization unit 3 of the fluidizing apparatus 1 in the emptying state too.

As soon as the distributor plate 7 is arranged on the web 30 in the emptying position in the emptying state, the shut-off device 24 opens up the material discharge 19. The material M' treated in the fluidization unit 3 is then discharged. The shut-off device 24 is preferably opened as far as possible in the emptying state, so that the material outlet surface 22 of the material outlet 21 is as large as possible, as a result of which an improved discharge of the treated material M' is promoted in addition.

In the emptying position, the swivel movement through the distributor plate 7 swivelled about the swivel axis 29 causes a gap 32 to be formed between the distributor plate 7 and the fluidization unit 3, in particular between the distributor plate 7 and the distributor chamber inner wall 11 and/or the fluidization chamber inner wall 16, which gap extends substantially around the entire circumference of the distributor plate 7. A gap width formed in this case varies. In the emptying state, process gas PG flows through the gap 32, so that treated material M' cannot reach, or fall into, the distributor chamber 5 during discharge from the fluidization chamber 6.

In the region of the material outlet 21, the web 30 on the one hand prevents the material M' to be discharged from reaching or falling and, on the other hand, the web 30 on which the distributor plate 7 is arranged, prevents the process gas flow from flowing around the distributor plate 7 in the region of the material outlet surface 22 and thereby forming a kind of “process gas curtain” which restricts, or completely prevents, the discharge of the treated material.

Figure 4:
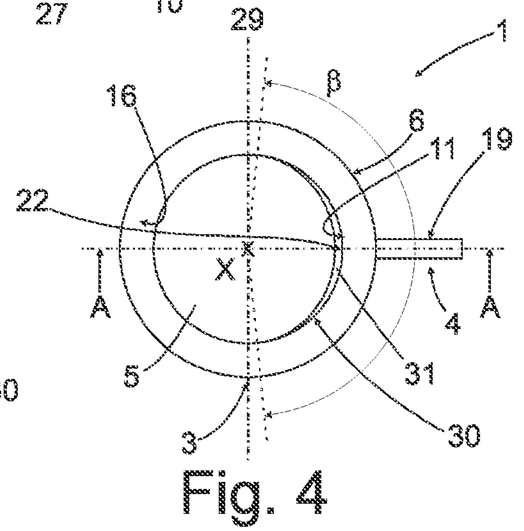
FIG. 4 shows a plan view of the schematic representation of the first embodiment of the fluidizing apparatus in the emptying position.

FIG. 4 shows a plan view of a schematic representation of the first embodiment of fluidizing apparatus 1 according to FIG. 1, wherein the fluidizing apparatus 1 is in the emptying state. In this case, the distributor plate 7 is arranged on the web 30 in a position swivelled about the swivel axis 29 by the angle α, as a result of which the gap 32 of varying width is formed between the distributor plate 7 and the fluidization unit 3, in particular the distributor chamber inner wall 11 and/or the fluidization chamber inner wall 16. During the emptying process, process gas PG flows through the gap 32, so that no treated material M' can reach the distributor chamber 5.

The web 30 arranged in the distributor chamber 5 extends in the circumferential direction in the region of the material outlet surface 22. The upper side 31 of the web 30 is arranged tangentially to the lower edge 23*a* of the material outlet surface 22 of the material outlet 21. The web 30 has a sickle-shaped, in particular a crescent-shaped, design in this case. The web 30 is at an angle ß of 160°. In other embodiments not shown here, the web 30 is preferably at an angle ß of 5° to 180°, more preferably of 10° to 60°.

Figure 5:
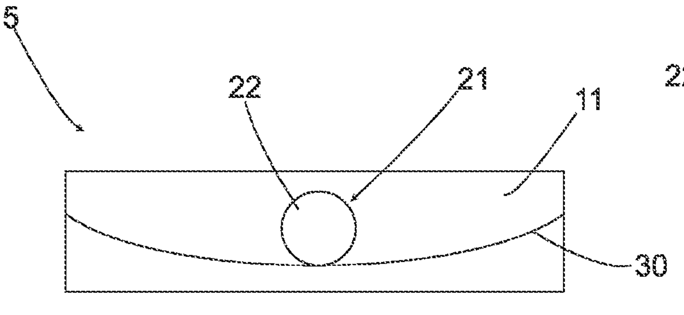
FIG. 5 shows a schematic representation of a projection of an inner side of the distributor chamber in the first embodiment of the fluidizing apparatus comprising a web and a material outlet in the emptying position.

FIG. 5 shows a schematic representation of a projection of a distributor chamber inner wall 11 comprising the web 30 and a material outlet 21 of the first embodiment of the fluidizing apparatus 1 in the emptying position. As already described in FIG. 4, the upper side 31 of the web 30 is arranged tangentially to the lower edge 23*a* of the material outlet surface 22 of the material outlet 21. The material outlet surface 22 is thereby opened to the maximum. The shut-off device 24 which is not depicted in FIG. 5 opens up the material discharge 19 in the emptying position, so that the treated material M' can be efficiently discharged from the fluidization chamber 6 via the material outlet surface 22 of the fluidization unit 3 which is opened to the maximum. The projected representation comprises the web 30 designed with a sickle shape, wherein the web 30 has an angle ß of approximately 160°.

Figure 6:
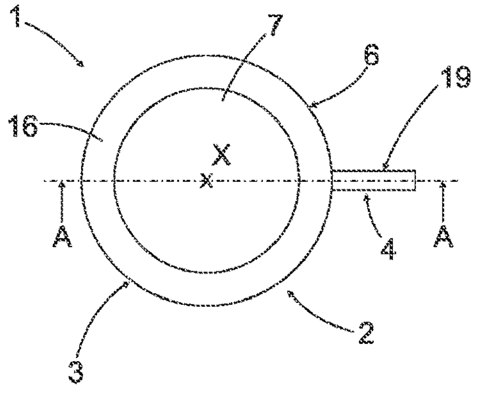
FIG. 6 shows a plan view of a schematic representation of a second embodiment of Fluidizing apparatus in the operating position with a sectional plane A-A.

FIG. 6 shows, in accordance with FIG. 1, a plan view of a schematic representation of a second embodiment of the fluidizing apparatus 1 designed as fluidized bed equipment 2 with a sectional plane A-A. The fluidizing apparatus 1 comprises a fluidization unit 3 having a central longitudinal axis X-X, on which fluidization unit an emptying pipe 4 comprising a central axis Y-Y running perpendicular to the longitudinal axis X-X is arranged. The central axis Y-Y and the longitudinal axis X-X span the sectional plane A-A. The fluidizing apparatus 1 is in the operating state.

Figure 7:
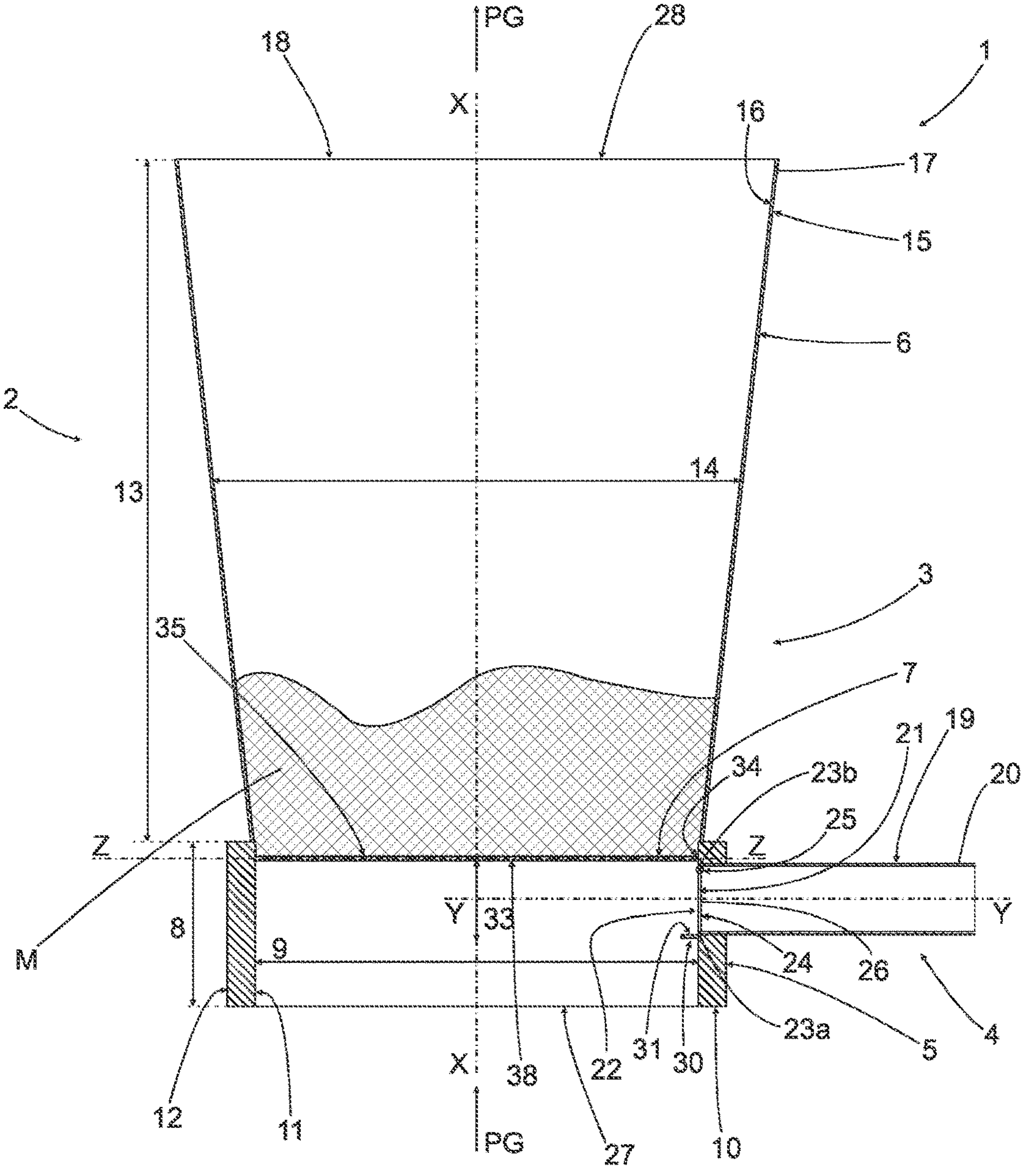
FIG. 7 shows a section along the sectional plane A-A shown in FIG. 6 through the schematic representation of the second embodiment of the fluidization equipment in the operating position with a distributor plate arranged in a plane Z-Z in the horizontal position.

FIG. 7 shows a section along the sectional plane A-A from FIG. 6 through the schematic representation of the second embodiment of the fluidizing apparatus 1 which is in the operating state. In the operating position, the distributor plate 7 lies in a plane Z-Z which runs at right angles to the sectional plane A-A, so that material M to be treated is arranged above the distributor plate 7 in the operating state in the fluidization chamber 6 and can be fluidized and treated there.

Moreover, the second embodiment of the fluidization equipment 1 is substantially identical to the first embodiment of the fluidizing apparatus 1. The two embodiments differ in the technical embodiment of the relative movement performed between the fluidization unit 3 and the distributor plate 7. Instead of the swivel movement—as in the first embodiment—the distributor plate 7 performs a linear movement in the axial direction 33 of the longitudinal axis X-X in the second embodiment. The distributor plate 7 is therefore arranged so as to be displaceable in the axial direction 33 of the longitudinal axis X-X.

Moreover, the web 30 is arranged below the material outlet 21 against the flow direction of the process gas, which further distinguishes the second embodiment from the first embodiment. The web 30 is therefore arranged spaced apart at a distance c from the lower edge 23*a* of the material outlet surface 22. In particular, the distance c is vanishingly small in embodiments which are not shown, advantageously equal to zero.

Figure 8:
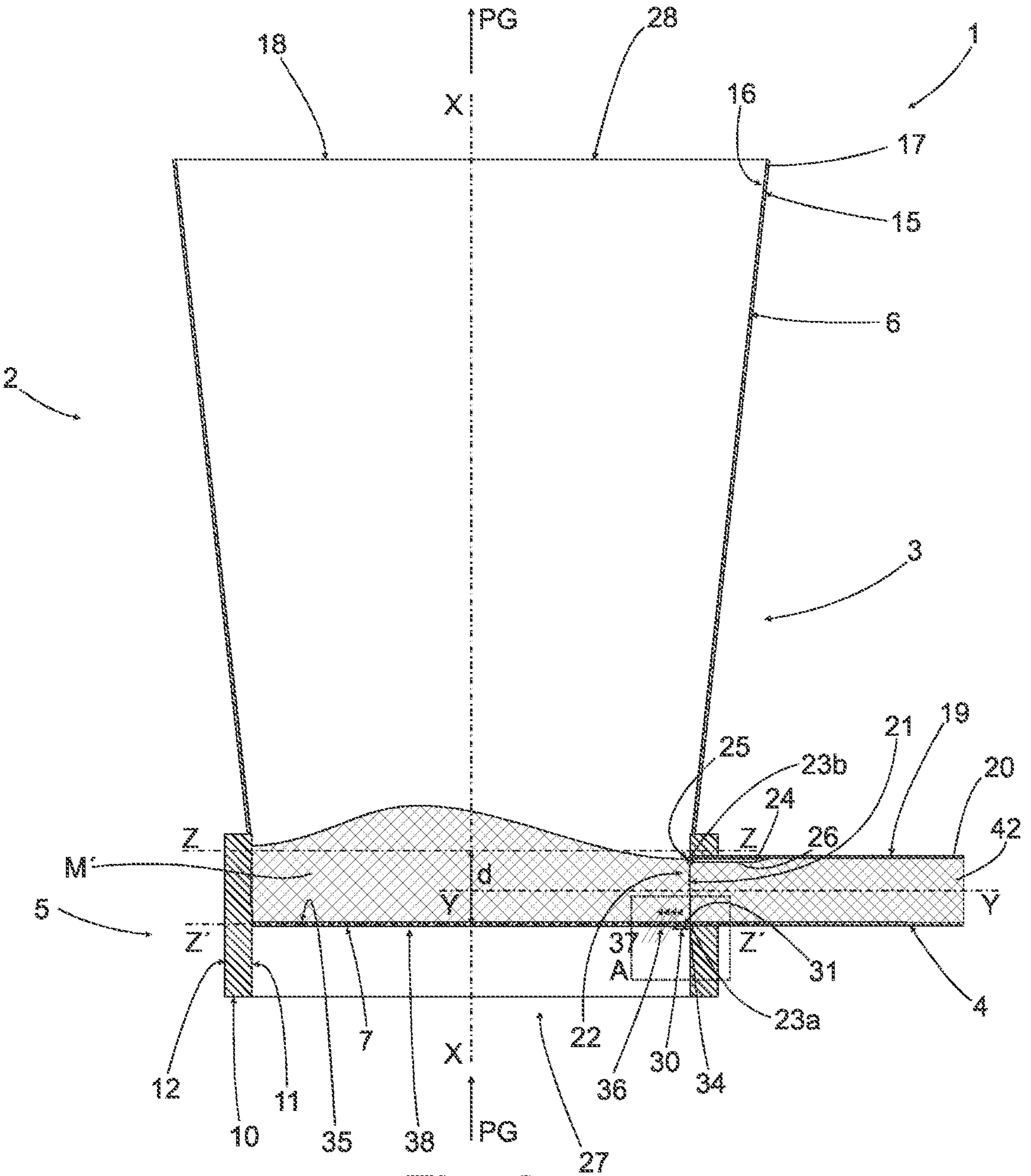
FIG. 8 shows a section along the sectional plane A-A shown in FIG. 6 through the schematic representation of the second embodiment of the fluidizing apparatus in the emptying position with the distributor plate arranged in a plane Z'-Z' in the horizontal position.

FIG. 8 shows a section along the sectional plane A-A from FIG. 6 through the schematic representation of the second embodiment of the fluidizing apparatus 1 with a distributor plate 7 arranged in a plane Z'-Z' in the horizontal position, the emptying position. The plane Z'-Z' runs parallel to the plane Z-Z at a distance d. The distributor plate 7 is displaced downwards by the distance d in the axial direction 33 of the central longitudinal axis X-X, i.e. from the plane Z-Z into the plane Z'-Z'. In the embodiment shown, the distributor plate 7 rests on the web 30, so that an upper edge 34 of the distributor plate 7 and/or an upper side 35 is advantageously arranged at the same height as the lower edge 23*a* of the material outlet 21. The upper edge 34 and/or the upper side 35 of the distributor plate 7 are particularly arranged tangentially to the lower edge 23*a* of the material outlet 21. The material outlet surface 22 of the material outlet 21 is therefore completely open, so that the discharge of treated material M' through the material channel 42 can be improved.

Advantageously, at least one discharge opening 36, in particular a plurality of discharge openings 36, is arranged in the perforated distributor plate 7 in the region of the material outlet 21, which discharge openings are oriented towards the material outlet 21, in accordance with the arrows 37 which are depicted. This means that in the emptying state, the discharge of the treated material M' is additionally supported by the process gas PG.

Figure 9:
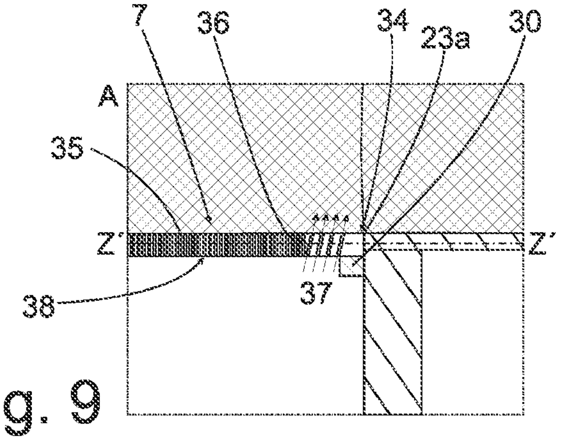
FIG. 9 shows an enlarged representation of the detail A shown in FIG. 8.

FIG. 9 shows an enlarged representation of the detail A depicted in FIG. 8, which represents the region of the material outlet 21. The perforated distributor plate 7 has through-openings 38 through which the process gas PG flows, in order to fluidize the particulate material M to be treated in the fluidization chamber 6. The through-openings 38 can be arranged at random, wherein the through-openings 38 are designed to meet the specific requirements of fluidization and/or treatment of the material M in accordance with the number and through-opening diameter.

Discharge openings 36 are arranged in the perforated distributor plate 7 in the region of the material outlet 21. The process gas PG flows in the direction of the arrows 37 through the discharge openings 36 and thereby supports an efficient and rapid discharge of the treated material M' in the emptying position. The discharge openings 36 can be arranged in a circular sector in front of the material outlet 21, for example. In addition, the upper edge 34 and/or the upper side 35 of the distributor plate 7 is lowered until it is flush with the height of the lower edge 23*a* of the material outlet 21, as a result of which the discharge of treated material M' is additionally promoted and encouraged due to the largest possible material outlet surface 22.

Figure 10:
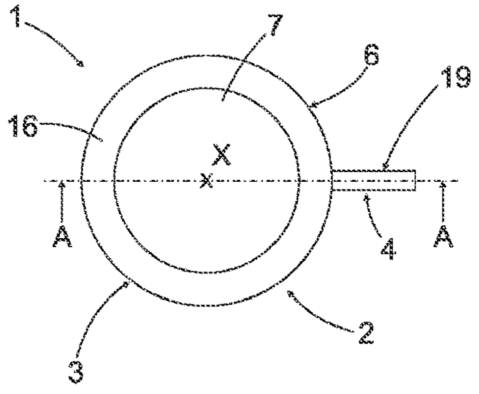
FIG. 10 shows a plan view of a schematic representation of a third embodiment of fluidizing apparatus in the operating position with a sectional plane A-A.

FIG. 10 shows a plan view of a schematic representation of a third embodiment of the fluidizing apparatus 1 designed as fluidized bed equipment 2 with a sectional plane A-A. The fluidizing apparatus 1 comprises a fluidization unit 3 having a central longitudinal axis X-X, on which fluidization unit an emptying pipe 4 comprising a central axis Y-Y running at right angles to the longitudinal axis X-X is arranged, wherein the central axis Y-Y and the longitudinal axis X-X span the sectional plane A-A. The fluidizing apparatus 1 is in the operating state.

Figure 11:
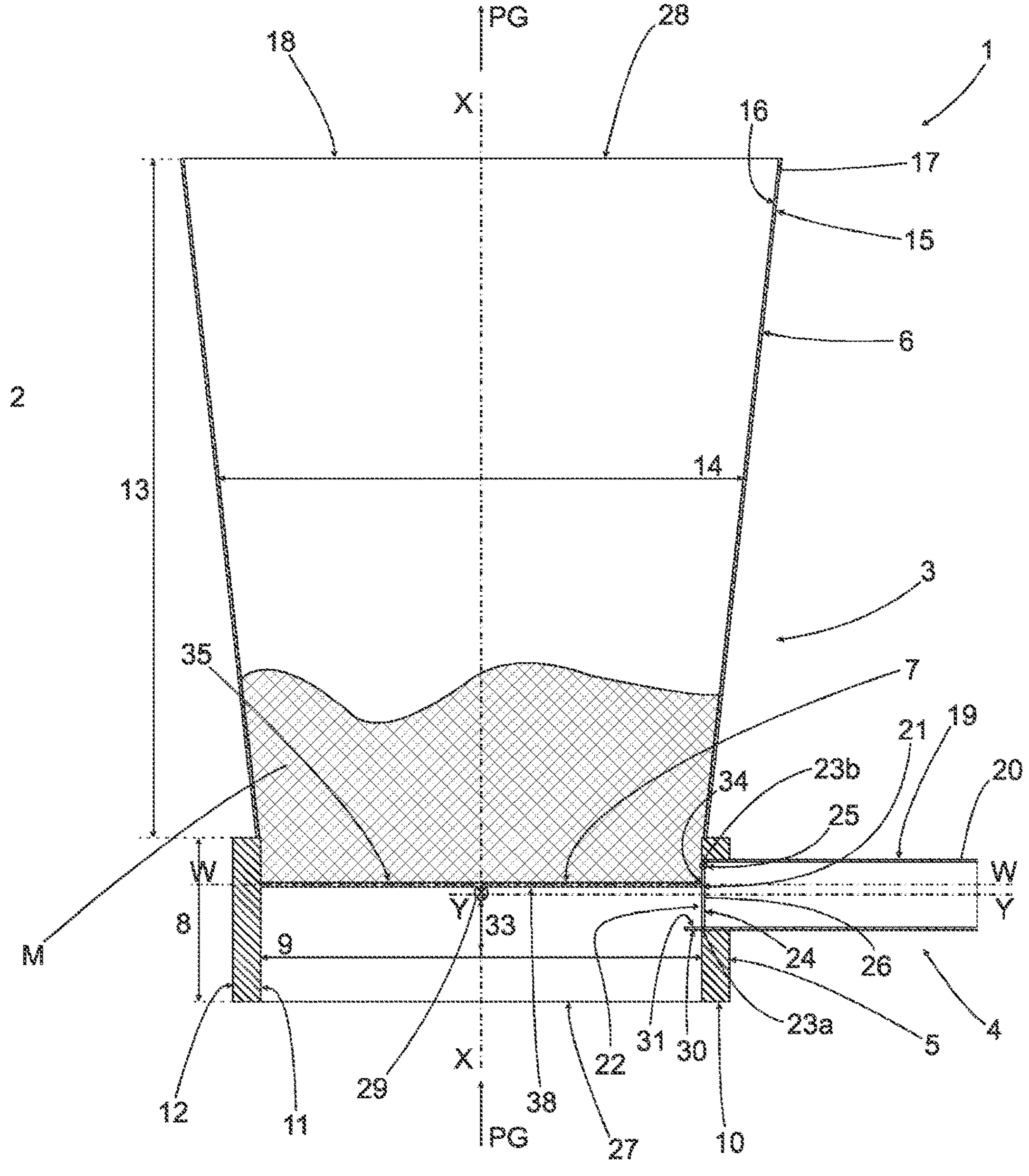
FIG. 11 shows a section along the sectional plane A-A from FIG. 10 through the schematic representation of the third embodiment of the fluidizing apparatus in the operating position with a distributor plate arranged in a plane Z-Z in the horizontal position.

FIG. 11 shows a section along the sectional plane A-A from FIG. 9 through the schematic representation of the third embodiment of the fluidizing apparatus 1 in the operating state with a distributor plate 7 arranged in a plane W-W in the horizontal position.

The third embodiment of the fluidizing apparatus 1 is substantially a combination of the first two embodiments. The distributor plate 7 can also be moved relative to the fluidization unit 3 in the third embodiment. In contrast to the first and second embodiments, the distributor plate 7 of the third embodiment is suitable, on the other hand, for carrying out a swivel movement about the swivel axis 29 and, on the other hand, a linear movement in the axial direction 33 of the longitudinal axis X-X. In the operating state shown, the particulate material M is treated in the fluidization chamber 6.

The swivel and linear movements of the distributor plate when the distributor plate 7 is moved from the operating position into the emptying position can be carried out in any order, consecutively or simultaneously with respect to one another. In this way, both the advantages of the swivel movement and of the linear movement come to bear. In the present embodiment, the swivel and linear movements are carried out simultaneously.

The material discharge 19 has a shut-off device 24 that can be swivelled about a swivel axis 25. The shut-off device 24 is advantageously designed as a flap 26, valve or rotary feeder, or the like. The shut-off device 24 designed as a flap 26 in the third embodiment closes or opens up the material discharge 19. In the operating state shown in FIG. 11—the distributor plate 7 is located above the lower edge 23*a* and below the upper edge 23*b* of the material outlet 21—the shut-off device 24 closes the material discharge 19. Consequently, neither process gas PG nor material M to be treated can flow out of, or be discharged from, the fluidization unit 3 of the fluidizing apparatus 1, in particular the fluidization chamber 6. In the embodiment shown, the flap 26 can be swivelled about a swivel axis 25 arranged perpendicular to the central axis Y-Y.

Figure 12:
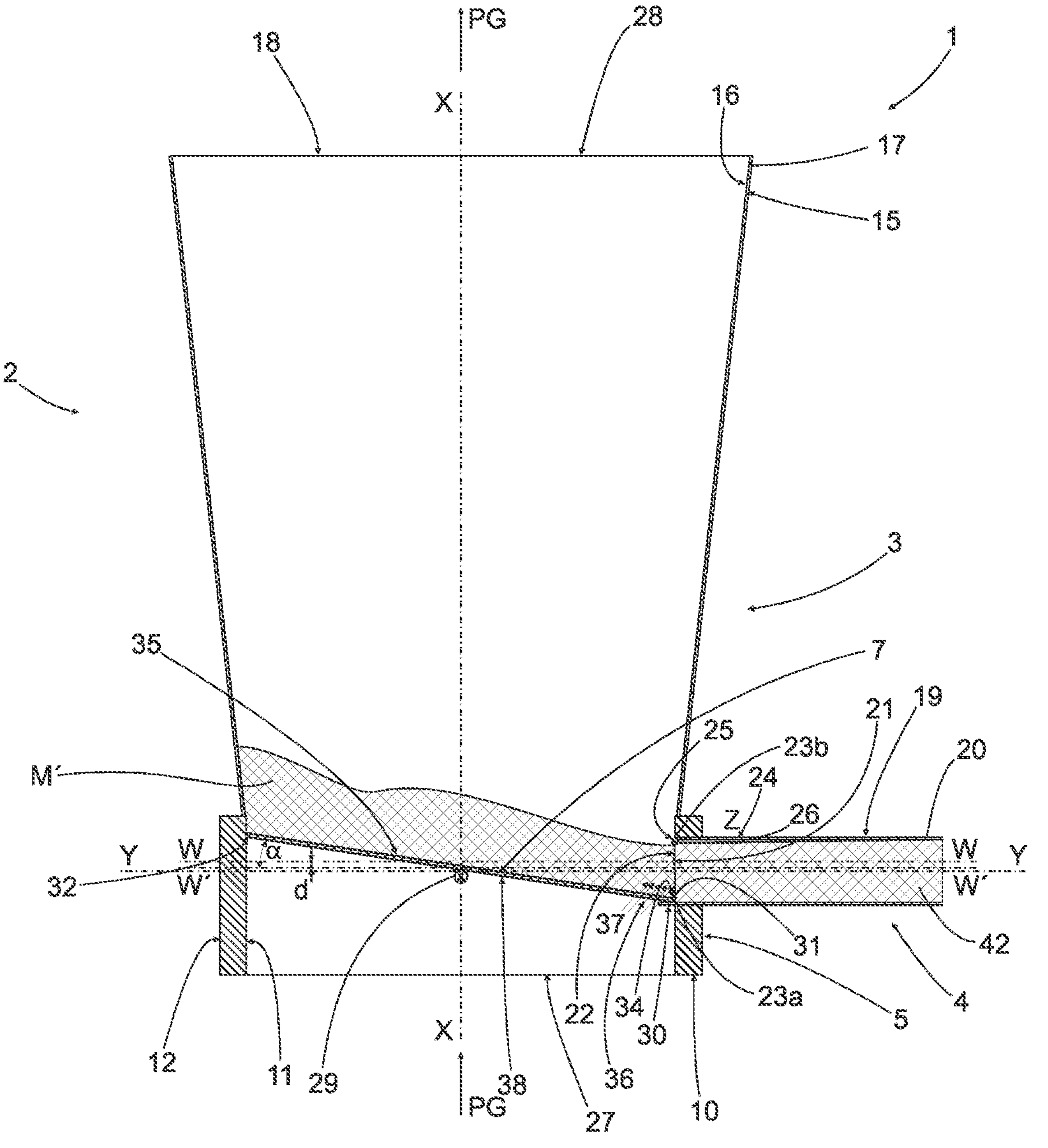
FIG. 12 shows a section along the sectional plane A-A from FIG. 10 through the schematic representation of the third embodiment of the fluidizing apparatus in the emptying position, wherein the distributor plate is displaced in a plane Z'-Z' in the axial direction of the longitudinal axis X-X and is swivelled about a swivel axis by an angle α.

FIG. 12 shows a section along the sectional plane A-A from FIG. 10 through the schematic representation of the third embodiment of the fluidizing apparatus 1.

In the emptying state, the particulate material M' which is treated in the fluidization chamber 6 is discharged from the fluidization unit 3 of the fluidizing apparatus 1 via the material discharge 19 comprising the material channel 42 designed as an emptying pipe 4. In this case, the shut-off device 24 is swivelled about the swivel axis 25 and opens up the material discharge 19 in the emptying state—the distributor plate is located at least partially below the upper edge 23*b* of the material outlet 21.

In this case, the distributor plate 7 is on the one hand swivelled about the swivel axis 29 by an angle α and, on the other hand, the swivel axis 29 is displaced from a plane W-W into a plane W'-W' oriented parallel to the plane W-W in the axial direction 33 of the longitudinal axis X-X. By lowering the swivel axis 29 of the distributor plate 7 from one plane W-W into a parallel plane W'-W' displaced at distance d, and through the simultaneous swivelling of the distributor plate 7 about the swivel axis 29, an improved discharge of the treated material M' from the fluidization chamber 6 is brought about. In the embodiment shown, the plane W'-W' is arranged above the central axis Y-Y. As a result, it is possible to keep the angle α, by which the distributor plate 7 is swivelled about the swivel axis 29, small, so that the gap 32 formed between the distributor plate 7 and the fluidization unit 3, in particular the distributor chamber inner wall 11 and/or the fluidization chamber inner wall 16, is minimized. This leads to a further improved discharge of the treated material M'.

The upper side 35 of the distributor plate 7 is positioned above the lower edge 23*a* of the material outlet 21 in the emptying position. The material discharge 19 exhibiting the shut-off device 24 is opened up by the shut-off device 24 swivelled about the swivel axis 25, so that the treated material M', supported by process gas PG flowing through the discharge openings 36, can be discharged.

The fourth embodiment of the fluidizing apparatus 1 shown in FIGS. 13 to 17 is substantially identical to the first embodiment of the fluidizing apparatus 1 shown in FIGS. 1 to 5. The difference between the two embodiments lies in the configuration of the material discharge 19 designed as an emptying pipe 4 and, associated with this, the arrangement of the web 30.

Figure 13:
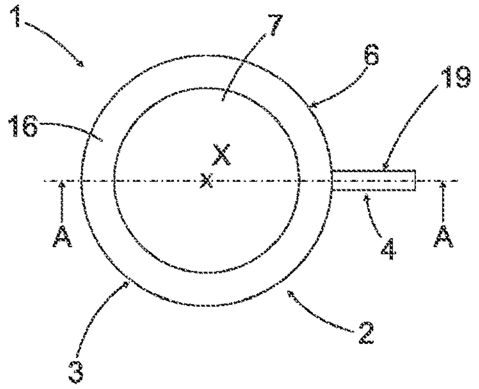
FIG. 13 shows a plan view of a schematic representation of a fourth embodiment of fluidizing apparatus in the operating position with a sectional plane A-A.

In this case, FIG. 13 shows a plan view of a schematic representation of a fourth embodiment of the fluidizing apparatus 1 designed as fluidized bed equipment 2 with a sectional plane A-A. The fluidizing apparatus 1 comprises a fluidization unit 3 having a central longitudinal axis X-X, on which an emptying pipe 4 comprising a central axis Y-Y extending perpendicular to the longitudinal axis X-X is arranged, wherein the central axis Y-Y and the longitudinal axis X-X span the sectional plane A-A. The fluidizing apparatus 1 is in the operating state.

Figure 14:
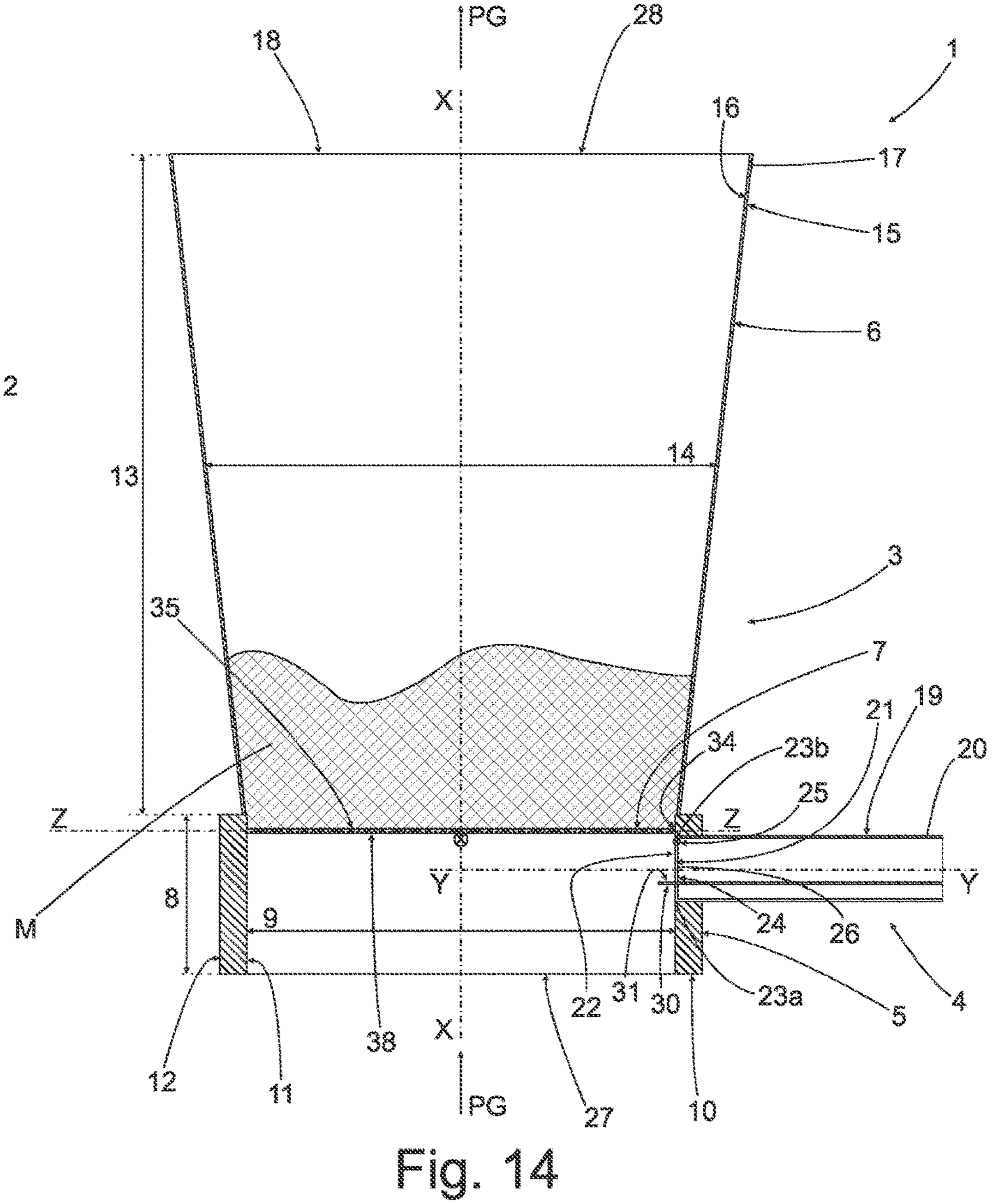
FIG. 14 shows a section along the sectional plane A-A from FIG. 13 through the schematic representation of the fourth embodiment of the fluidizing apparatus in the operating position with a distributor plate arranged in a plane Z-Z in the horizontal position and with a material discharge comprising a bottom insert.

FIG. 14 shows the fluidizing apparatus 1 in the operating state. In this case, the distributor plate 7 separating the distributor chamber 5 from the fluidization chamber 6 and lying in the plane W-W is arranged above the upper edge 23*b* of the material outlet 21. The material M to be treated is treated in the fluidization chamber 6 of the fluidization unit 3 of the fluidizing apparatus 1, in particular by the process gas PG. The process gas PG flows through the fluidization unit 3 from the fluid inlet 27 via the perforated distributor plate 7 to the fluid outlet 28.

In contrast to the first embodiment, in the fourth embodiment in FIG. 14, a fluid connection 40 comprising a fluid connection outlet 39 for supplying auxiliary gas HG is assigned to the material discharge 19 designed as an emptying pipe 4. The fluid connection outlet 39 is arranged in the region of the material outlet surface 22 of the material outlet 21.

The material discharge 19 designed as an emptying pipe 4 has a bottom insert 41. The bottom insert 41 divides the material discharge 19 into a material channel 42 transporting the treated material M' from the fluidization unit 3 and a fluid channel 43 carrying the auxiliary gas HG. The fluid connection outlet 39 is advantageously arranged in the bottom insert 41, so that the auxiliary gas HG can overflow from the fluid channel 43 into the material channel 42. The fluid connection outlet 39 is formed by bores 44 in the bottom insert 41. In this case, the fluid connection outlet 39, in particular the bores 44, is advantageously designed in such a manner that the auxiliary gas HG has an outflow direction towards the discharge of the treated material M' from the fluidizing apparatus 1.

Figure 15:
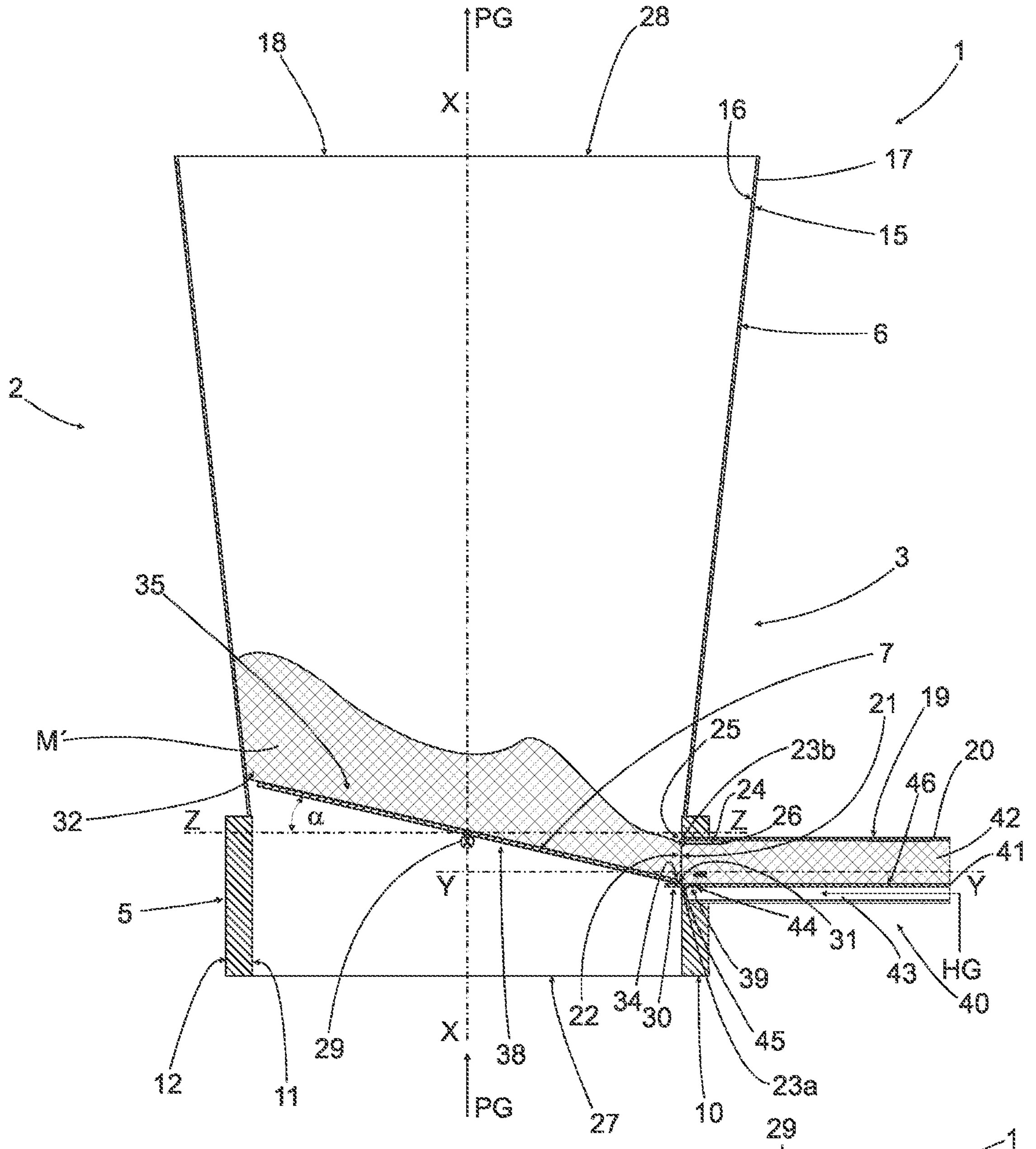
FIG. 15 shows a section along the sectional plane A-A shown in FIG. 13 through the schematic representation of the first embodiment of the fluidizing apparatus in the emptying position with the distributor plate arranged on the swivel axis in a position swivelled about the swivel axis by an angle α.

FIG. 15 shows the fluidizing apparatus 1 in the emptying state. In the emptying state, the distributor plate 7 is arranged in the emptying position, i.e. the distributor plate 7 has been moved relative to the fluidization unit 3, in such a manner that it is arranged on the web 30. In the emptying state, the distributor plate 7 rests on the web 30. The treated material M' is emptied via the material channel 42, wherein the auxiliary gas HG flows via the fluid connection outlet 39 from the fluid channel 43 into the material channel 42 and thereby promotes the emptying of the treated material M' from the fluidizing apparatus 1.

Figure 16:
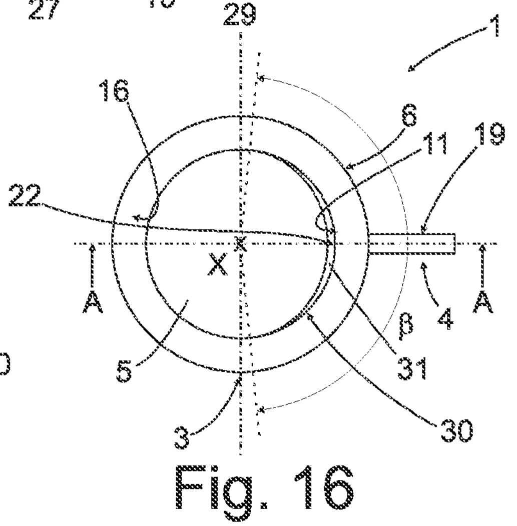
FIG. 16 shows a plan view of the schematic representation of the fourth embodiment of the fluidizing apparatus in the emptying position.

FIG. 16 shows a plan view of a schematic representation of the fourth embodiment of the fluidizing apparatus 1 according to FIG. 13, wherein the fluidizing apparatus 1 is in the emptying state. In this case, the distributor plate 7 is arranged in a position on the web 30 which is swivelled by an angle α about the swivel axis 29, as a result of which the gap 32, the gap width of which varies, is formed between the distributor plate 7 and the fluidization unit 3, in particular the distributor chamber inner wall 11 and/or the fluidization chamber inner wall 16. During the emptying process, process gas PG flows through the gap 32, so that no treated material M' can reach the distributor chamber 5.

In the region of the material outlet surface 22, the web 30 arranged on the distributor chamber inner wall 11 extends in the circumferential direction. The upper side 31 of the web 30 is arranged on the upper edge 45 of the bottom insert 41. The upper side 31 of the web 30 and the upper side 46 of the bottom insert 41 thereby form flat upper sides 31, 46 which adjoin one another in a flush manner. The web 30 in this case has a sickle-shaped, in particular a crescent-shaped, design. The web 30 is at an angle ß of 160°.

Figure 17:
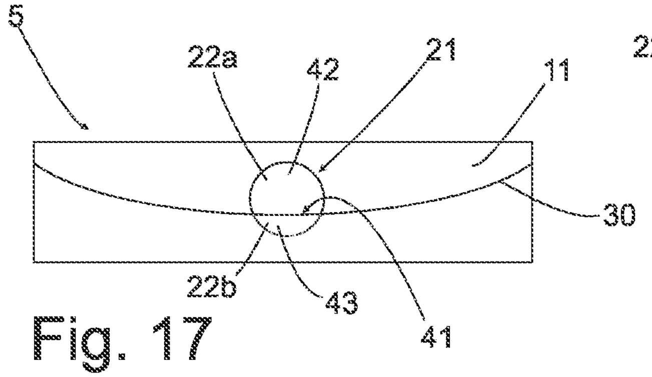
FIG. 17 shows a schematic representation of a projection of an inner side of the distributor chamber of the fourth embodiment of the fluidizing apparatus comprising a web and a material outlet in the emptying position.

FIG. 17 shows a schematic representation of a projection of a distributor chamber inner wall 11 comprising the web 30 and a material outlet 21 of the fourth embodiment of the fluidizing apparatus 1 in the emptying position. As has already been described in FIG. 16, the upper side 31 of the web 30 is arranged tangentially to the upper edge 45 of the bottom insert 41 of the material discharge 19. The upper side 31 of the web 30 and the upper side 46 of the bottom insert 41 therefore form flat upper sides 31, 46 which adjoin one another in a flush manner. This means that the material outlet surface 22 is smaller by comparison with the material outlet surface 22 of the first embodiment. The material outlet surface 22 is therefore divided into a material outlet surface 22*a* assigned to the material channel 42 and a material outlet surface 22*b* assigned to the fluid channel 43. In this case, the material outlet surface 22*a* is opened up by the shut-off device 24 in the emptying state and the material outlet surface 22*b* is designed as a distributor chamber inner wall 11.

In the emptying position, the shut-off device 24, which is not depicted in FIG. 17, opens up the material discharge 19, in particular the material outlet surface 22*a*, so that the treated material M' can be discharged from the fluidization chamber 6 of the fluidization unit 3 via the material channel 42 efficiently and supported by the auxiliary gas HG flowing from the fluid channel 43. The projected representation comprises the web 30 with a sickle-shaped design. The web 30 is at an angle ß of approximately 160°.

Figure 18:
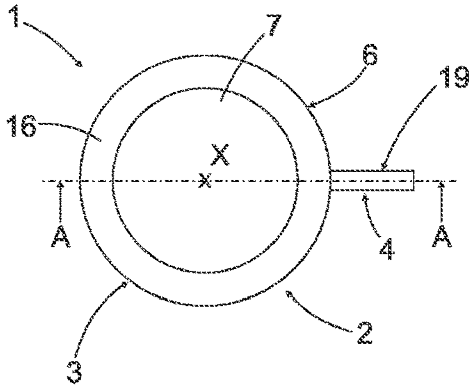
FIG. 18 shows a plan view of a schematic representation of a fifth embodiment of fluidizing apparatus in the operating position with a sectional plane A-A and FIG. 19 shows a section along the sectional plane A-A shown in FIG. 18 through the schematic representation of the fifth embodiment of the fluidizing apparatus in the emptying position with the distributor plate arranged on the swivel axis in a position swivelled about the swivel axis by an angle α.
Figure 19:
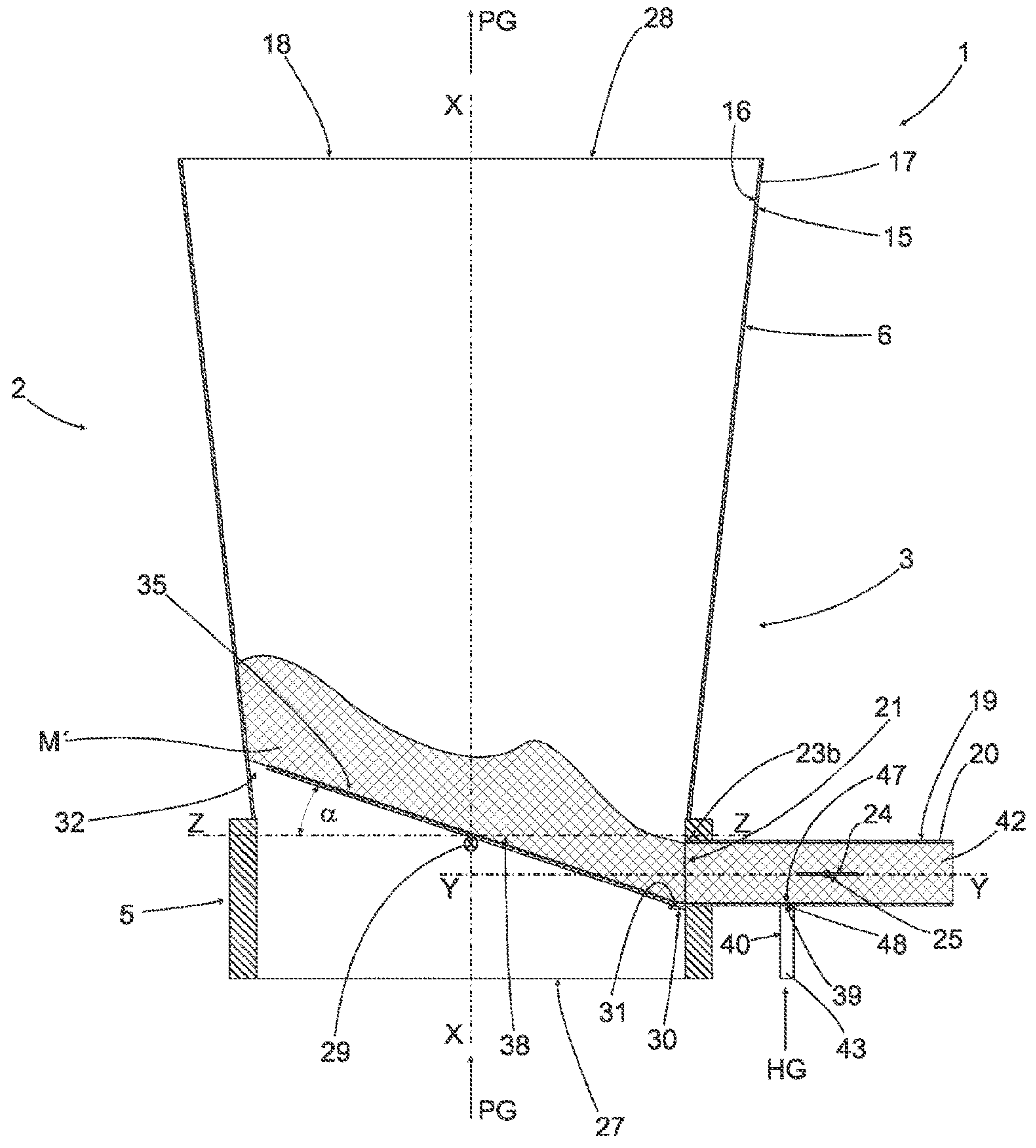

FIGS. 18 and 19 show a further fifth embodiment of the fluidizing apparatus 1. In this case, FIG. 18 shows a plan view of a schematic representation of the fifth embodiment of fluidizing apparatus 1 in the operating position with a sectional plane A-A and FIG. 19 shows a section along the sectional plane A-A depicted in FIG. 18 through the schematic representation of the fifth embodiment of the fluidizing apparatus 1 in the emptying position with the distributor plate 7 arranged on the swivel axis 29 in a position swivelled about the swivel axis 29 by an angle α.

The fifth embodiment is substantially identical to the first embodiment. The two embodiments are distinguished in that the web 30 is arranged below the material outlet 21 against the flow direction of the process gas PG. The web 30 is spaced apart from the lower edge 23*a* of the material outlet surface 22.

Furthermore, the two embodiments differ from one another in that a fluid connection 40 with a fluid connection outlet 39 for providing an auxiliary gas HG is assigned to the material discharge 19 designed as an emptying pipe 4. The fluid connection outlet 39 is arranged in the emptying pipe wall 20 and is provided with a perforated cover 47. The bores 48 penetrating the perforated cover 47 are aligned in such a manner that the auxiliary gas HG emerging from the fluid connection 40 into the material channel 42 flows out of the fluidizing apparatus 1 towards the discharge of the treated material M'.

The shut-off device 24 designed as a flap 26 is arranged so as to swivel about the swivel axis 25, wherein the swivel axis 25 is arranged at right angles to the central axis Y-Y and crosses said axis. In the emptying position depicted in FIG. 19, the flap 26 opens up the material discharge 19, in order to empty the fluidization chamber 6.

The invention claimed is:

1. A fluidizing apparatus for the treatment of particulate material, comprising:

a fluidization unit which has a longitudinal axis and which has a perforated distributor plate which divides the fluidization unit into a distributor chamber and a fluidization chamber arranged above said distributor chamber, wherein the fluidization chamber comprises a material inlet for the material to be treated and the distributor chamber comprises a material discharge which has a material outlet for the treated material with a material outlet surface, a lower and an upper edge, and a shut-off device closes the material discharge, and wherein the distributor chamber comprises a fluid inlet and the fluidization chamber comprises a fluid outlet for a process gas flowing from the fluid inlet through the perforated distributor plate to the fluid outlet and fluidizing the material in the fluidization chamber, wherein the distributor chamber comprises a web arranged in the region of the material outlet surface and extending at least partially in the circumferential direction and the distributor plate (is arranged movably relative to the fluidization unit, wherein the distributor plate can be moved into an emptying position through a movement of the distributor plate-relative to the fluidization unit, wherein the distributor plate is arranged on the web in the emptying state, in such a manner that a fluid connection is created between the material outlet arranged in the distributor chamber and past the fluidization chamber on the distributor plate, in order to discharge treated material from the fluidization unit, and wherein in the emptying state the shut-off device opens up the material discharge in the emptying position of the distributor plate in the emptying state.

2. The fluidizing apparatus according to claim 1, wherein the distributor plate is arranged above the upper edge of the material outlet in an operating position.

3. The fluidizing apparatus according to claim 1, wherein an upper side of the web is arranged tangentially to the material outlet surface of the material outlet or against the flow direction of the process gas beneath the material outlet.

4. The fluidizing apparatus according to claim 3, wherein the upper side of the web is arranged tangentially to the lower edge of the material outlet surface of the material outlet.

5. The fluidizing apparatus according to claim 1, wherein the web is sickle-shaped or ring-shaped in design.

6. The fluidizing apparatus according to claim 1, wherein the fluidization unit has a swivel axis running transversely to the longitudinal axis of the fluidization unit, on which swivel axis the distributor plate is arranged in a swivelling manner.

7. The fluidizing apparatus according to claim 6, wherein the swivel axis runs at right angles to the longitudinal axis of the fluidization unit.

8. The fluidizing apparatus according to claim 1, wherein the distributor plate is arranged so as to be displaceable in the axial direction of the longitudinal axis.

9. The fluidizing apparatus according to claim 1, wherein the fluidization unit has a swivel axis, which runs transversely to the longitudinal axis of the fluidization unit and is arranged so as to be displaceable in the axial direction of the longitudinal axis, on which swivel axis the distributor plate is arranged such that it can swivel.

10. The fluidizing apparatus according to claim 1, wherein the distributor plate is positioned in the emptying position by the movement of the distributor plate-relative to the fluidization unit with the lower edge of the material outlet flush, or at least partially below the lower edge of the material outlet.

11. The fluidizing apparatus according to claim 10, wherein the distributor plate is positioned below the lower edge of the material outlet in the emptying position by the movement of the distributor plate relative to the fluidization unit.

12. The fluidizing apparatus according to claim 1, wherein the material discharge designed as an emptying pipe is assigned a fluid connection comprising a fluid connection outlet for providing an auxiliary gas.

13. The fluidizing apparatus according to claim 12, wherein the material discharge has a bottom insert which divides the material discharge into a material channel transporting the treated material from the fluidization unit and a fluid channel carrying the auxiliary gas, wherein the fluid connection outlet is arranged in the bottom insert, so that the auxiliary gas can overflow from the fluid channel into the material channel.

14. The fluidizing apparatus according to claim 12, wherein the fluid connection outlet has a perforated cover or is formed by bores-in the bottom insert.

15. The fluidizing apparatus according to claim 12, wherein the fluid connection outlet is designed in such a manner that the auxiliary gas has an outflow direction towards the discharge of the treated material.

16. The fluidizing apparatus according to claim 12, wherein the fluid connection outlet is arranged in the region of the material outlet surface.

* * * * *